United States Patent
Akashi

(10) Patent No.: US 8,717,424 B2
(45) Date of Patent: May 6, 2014

(54) DISPLAY APPARATUS AND RECORDING MEDIUM FOR CONTROLLING PLAYBACK OF THREE-DIMENSIONAL VIDEO BASED ON DETECTED PRESENCE OF STEREOSCOPIC-VIEWING GLASSES

(75) Inventor: Aiko Akashi, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 85 days.

(21) Appl. No.: 13/214,829

(22) Filed: Aug. 22, 2011

(65) Prior Publication Data

US 2012/0081525 A1  Apr. 5, 2012

(30) Foreign Application Priority Data

Sep. 30, 2010  (JP) ................................. 2010-223185

(51) Int. Cl.
| | | |
|---|---|---|
| H04N 13/04 | (2006.01) | |
| H04N 5/765 | (2006.01) | |
| H04N 15/00 | (2006.01) | |
| H04N 5/44 | (2011.01) | |
| G02B 27/22 | (2006.01) | |
| G02B 27/02 | (2006.01) | |
| G06F 3/01 | (2006.01) | |

(52) U.S. Cl.
CPC ....... *H04N 13/0468* (2013.01); *H04N 13/0429* (2013.01); *H04N 13/0484* (2013.01); *H04N 13/0452* (2013.01); *H04N 13/0454* (2013.01); *G02B 27/2228* (2013.01); *G02B 27/022* (2013.01); *G06F 3/013* (2013.01)
USPC ................ 348/53; 348/54; 386/200; 386/234

(58) Field of Classification Search
CPC .......... H04N 13/0429; H04N 13/0454; H04N 13/0468; H04N 13/0484; G02B 27/022; G02B 27/2228; G06F 3/013
USPC .............................. 348/54, 55, 56, 57, 58, 51
See application file for complete search history.

(56) References Cited

U.S. PATENT DOCUMENTS 5,781,229 A * 7/1998 Zediker et al. .................. 348/51
8,269,822 B2 * 9/2012 Zalewski ........................ 348/56

(Continued)

FOREIGN PATENT DOCUMENTS

| JP | 10-042315 | 2/1998 |
| JP | 11-075223 | 3/1999 |

(Continued)

OTHER PUBLICATIONS

Z.Y. Alpaslan, S.C. Yeh, A.A. Rizzo, & A.A. Sawchuck, "Quantitative Comparison of Interaction with Shutter Glasses and Autostereoscopic Displays", 5664 Proc. SPIE 616-625 (Jun. 14, 2005).*

(Continued)

*Primary Examiner* — Dave Czekaj
*Assistant Examiner* — David N Werner
(74) *Attorney, Agent, or Firm* — Blakely, Sokoloff, Taylor & Zafman LLP

(57) ABSTRACT

A display apparatus configured to display three-dimensional video viewable by a viewer wearing stereoscopic-viewing glasses. The display apparatus includes: an input module; a display device; an image input module; a detection module; and a recording module. The input module receives video data. The display device displays the three-dimensional video based on the received video data. The image input module receives a captured image from an image-capturing device that captures an image of an area around the display apparatus and on a side facing the display device. The detection module detects an image of the stereoscopic-viewing glasses from the received captured image. The recording module records the received video data when the image of the stereoscopic-viewing glasses is not detected by the detection module.

10 Claims, 7 Drawing Sheets

(56) References Cited

U.S. PATENT DOCUMENTS

| | | | | |
|---|---|---|---|---|
| 8,310,527 | B2* | 11/2012 | Ko et al. | 348/55 |
| 8,314,832 | B2* | 11/2012 | Mann et al. | 348/51 |
| 8,325,223 | B2* | 12/2012 | Ko et al. | 348/55 |
| 8,370,873 | B2* | 2/2013 | Shintani | 725/39 |
| 2011/0261155 | A1* | 10/2011 | Tsuruga et al. | 348/43 |

FOREIGN PATENT DOCUMENTS

| | | |
|---|---|---|
| JP | 2000-004453 | 1/2000 |
| JP | 2002-344998 | 11/2002 |
| JP | 2005-260741 | 9/2005 |
| JP | 2006-20160 | 1/2006 |
| JP | 2006-196995 | 7/2006 |
| JP | 2006-211061 | 8/2006 |
| JP | 2009-296118 | 12/2009 |

OTHER PUBLICATIONS

Machine translation of JP 2009-296118 A.*
J. Salton, "3DSwitch knows when you are wearing 3D glasses", Gizmag (Mar. 7, 2010). Available online at http://www.gizmag.com/sisvel-3dswitch/14414/.*
Japanese Patent Application No. 2010-223185; Notice of Reasons for Rejection; Mailed Jan. 24, 2012 (with English translation).

* cited by examiner

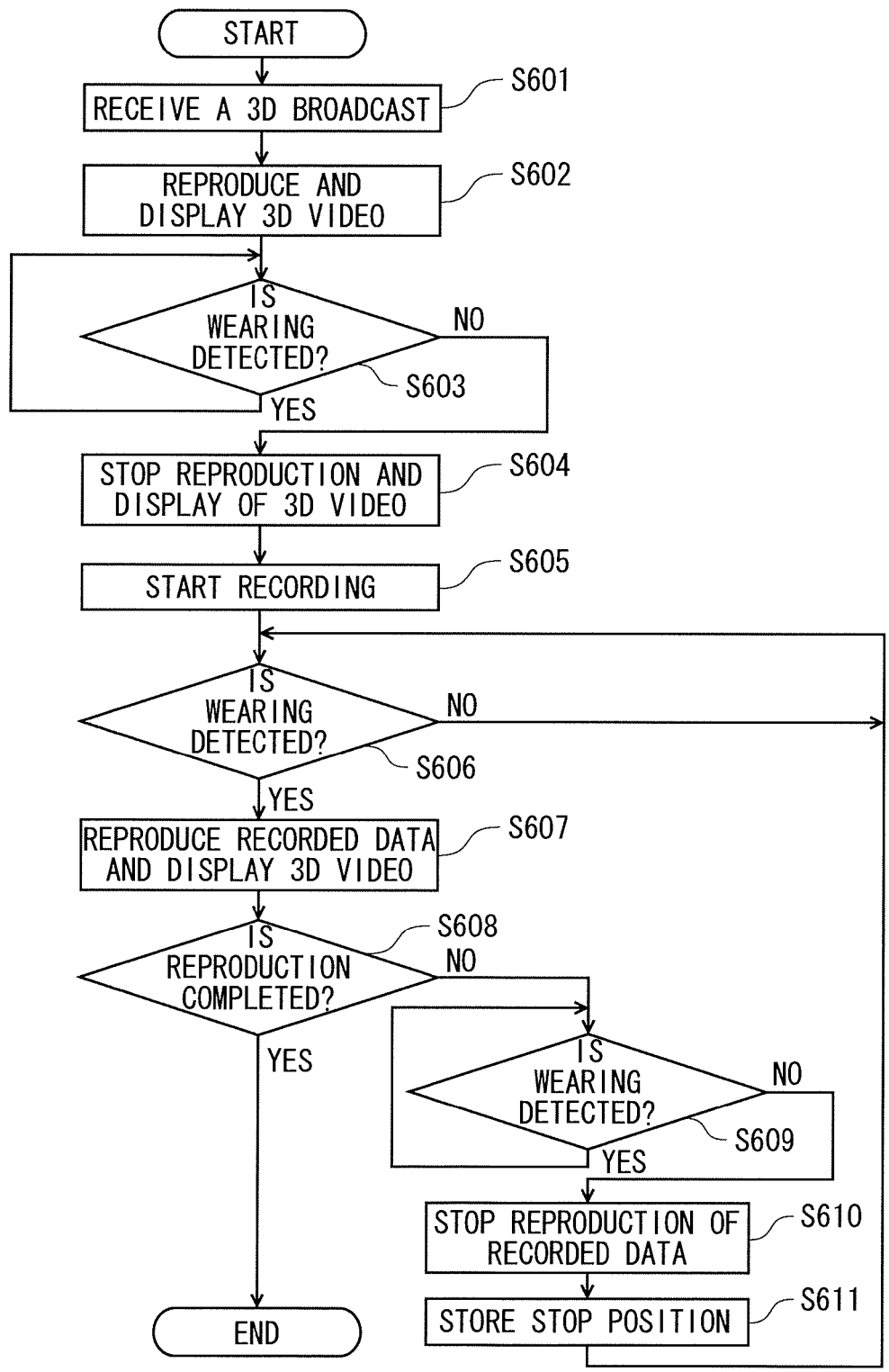

DISPLAY APPARATUS AND RECORDING MEDIUM FOR CONTROLLING PLAYBACK OF THREE-DIMENSIONAL VIDEO BASED ON DETECTED PRESENCE OF STEREOSCOPIC-VIEWING GLASSES

CROSS REFERENCE TO RELATED APPLICATION(S)

The present disclosure relates to the subject matters contained in Japanese Patent Application No. 2010-223185 filed on Sep. 30, 2010, which are incorporated herein by reference in its entirety.

FIELD

An embodiment of the present invention relates to a display apparatus, a recording method and a computer-readable recording medium.

BACKGROUND

There is a technique for displaying three-dimensional video to a viewer wearing three-dimensional video viewing glasses (hereinafter referred to as stereoscopic-viewing glasses). In this technique, right-eye and left-eye images with parallax are displayed on a display apparatus. The right-eye and left-eye images displayed on the display apparatus are selectively shut by the stereoscopic-viewing glasses. As a result, the right-eye image is selectively viewed by the viewer's right eye and the left-eye image is selectively viewed by the viewer's left eye, so that the viewer recognizes the three-dimensional video.

When three-dimensional video is to be displayed on the display apparatus, it is preferable that recording can be performed at a suitable time in accordance with whether a viewer viewing a display screen is wearing stereoscopic-viewing glasses or not.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

FIG. 6 is a flow chart showing an example of a processing flow concerned with video display performed by the computer according to the embodiment.

DETAILED DESCRIPTION OF THE EMBODIMENTS

Figure 1:
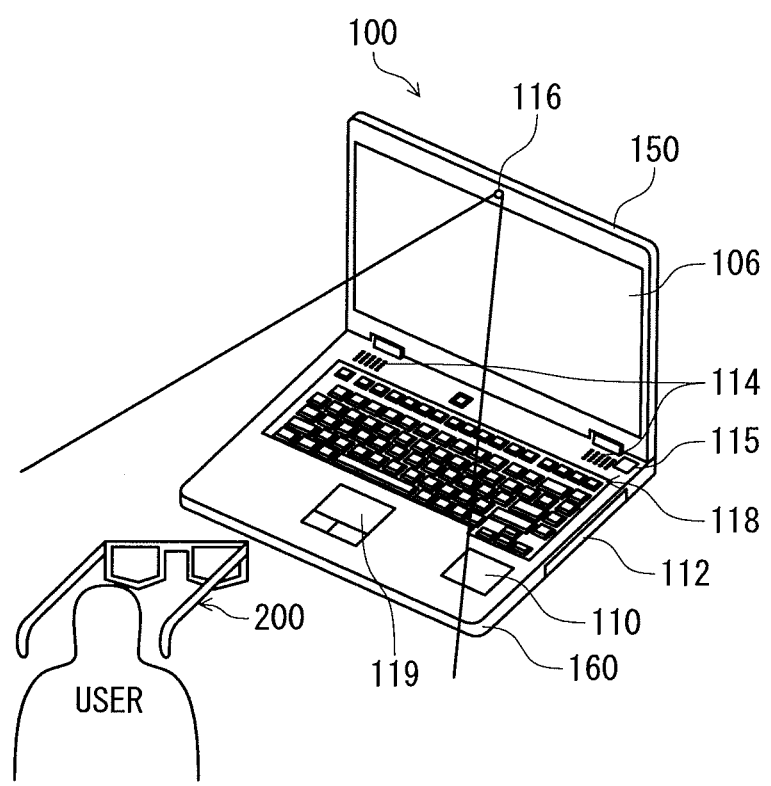
FIG. 1 is a view showing an example of how a computer according to an embodiment of the invention is used.

According to one embodiment, a display apparatus configured to display three-dimensional video viewable by a viewer wearing stereoscopic-viewing glasses. The display apparatus includes: an input module; a display device; an image input module; a detection module; and a recording module. The input module receives video data. The display device displays the three-dimensional video based on the received video data. The image input module receives a captured image from an image-capturing device that captures an image of an area around the display apparatus and on a side facing the display device. The detection module detects an image of the stereoscopic-viewing glasses from the received captured image. The recording module records the received video data when the image of the stereoscopic-viewing glasses is not detected by the detection module.

An embodiment of the invention will be described below with reference to the drawings.

A display apparatus according to this embodiment is implemented, for example, as a notebook computer 100. The computer 100 includes a display housing 150, and a body housing 160.

The display housing 150 includes a flat boxed housing, a Liquid Crystal Display (LCD) 106, and a camera 116. For example, the camera 116 is provided at a position above the LCD 106 when the display housing 150 is erected. The display housing 150 is rotatably connected to the body housing 160 with respect to the body housing 160. The body housing 160 is shaped like a flat box.

Speakers 114, a keyboard 118, a touchpad 119, etc. are disposed in a top face of the body housing 160. The body housing 160 further has an HDD 110 for storing video data, an ODD 112 for reading data from a medium such as an optical disc, a tuner 115 for receiving video data such as a television broadcast, etc.

The computer 100 controls the LCD 106 to display three-dimensional video (stereoscopic video), for example, based on video data read by the ODD 112 or video data received by the tuner 115. When three-dimensional video is displayed, the computer 100 controls the camera 116 to take an image of the LCD 106 side around the computer 100, that is, in a direction where a viewer is located to view a display screen.

For example, the computer 100 uses a shutter system (also called time-division system) when three-dimensional video is displayed. In shutter-system three-dimensional video display, left-eye and right-eye images are displayed alternately on the LCD 106. On this occasion, the LCD 106 is driven, for example, at a refresh rate (e.g. 120 Hz) twice as high as the ordinary refresh rate (e.g. 60 Hz). That is, frame data for left-eye image and frame data for right-eye image are displayed alternately, for example, at a refresh rate of 120 Hz on the LCD 106.

When the viewer wearing three-dimensional video viewing glasses 200 (hereinafter referred to as stereoscopic-viewing glasses 200) such as liquid crystal shutter glasses views the display screen, the viewer is able to view three-dimensional video while an image corresponding to the left-eye frame is viewed by the viewer's left eye and an image corresponding to the right-eye frame is viewed by the viewer's right eye. Incidentally, the liquid crystal shutter glasses receive synchronizing signals indicating respective display timings of the left-eye and right-eye frame data from the computer 100 and open/close left-eye and right-eye shutters in accordance with the synchronizing signals.

A polarizing system may be used for displaying three-dimensional video. In this case, interleaved frame groups generated by interleaving left-eye and right-eye images, for example, for each scanning line are displayed on the LCD 106. A polarizing filter with which the screen of the LCD 106 is covered polarizes the left-eye image displayed on the odd-numbered line group and the right-eye image displayed on the even-numbered line group on the screen of the LCD 106 in different directions. When the viewer uses stereoscopic-viewing glasses 200 such as polarized glasses, the viewer is able to view the left-eye image with the viewer's left eye and the right-eye image with the viewer's right eye.

The computer 100 according to this embodiment can record video data received by the tuner 115 or the like on the HDD 110 at a suitable time according to the viewer's status based on images for the stereoscopic-viewing glasses 200 included in the images taken by the camera 116.

Figure 2:
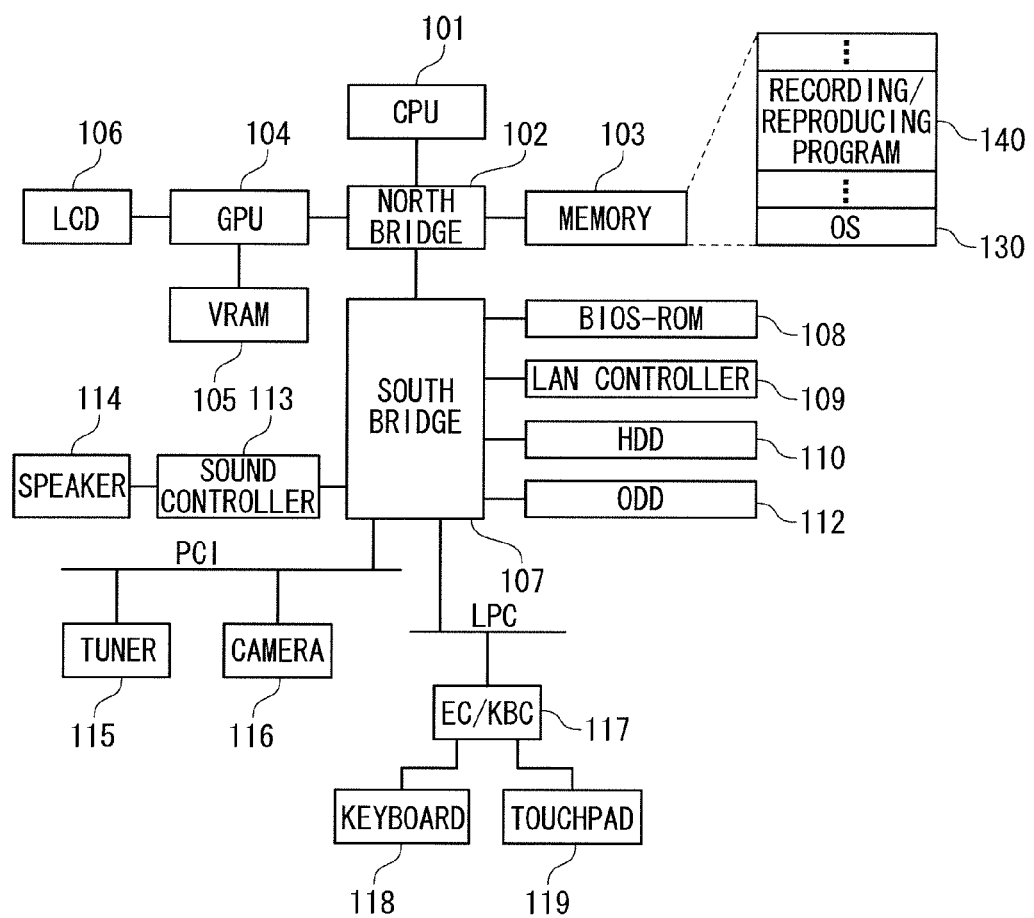
FIG. 2 is a diagram showing an example of a system configuration of the computer according to the embodiment.

An example of a system configuration of the computer 100 will be described below with reference to FIG. 2.

The computer 100 includes a CPU 101, a north bridge 102, a memory 103, a GPU 104, a VRAM 105, an LCD 106, a south bridge 107, a BIOS-ROM 108, an LAN controller 109, an HDD 110, an ODD 112, a sound controller 113, speakers 114, a tuner 115, a camera 116, an EC/KBC 117, a keyboard 118, a touchpad 119, etc.

The CPU 101 has a function of controlling operation of the computer 100. The CPU 101 loads various programs such as an operating system (OS) 130, a recording/reproducing program 140, etc. onto the memory 103 and runs these programs. The recording/reproducing program 140 is software having a function of processing video data. Details of the recording/reproducing program 140 will be described later with reference to FIGS. 3 to 7.

The north bridge 102 is a bridge device which connects the CPU 101 and the south bridge 107 to each other. The north bridge 102 has a built-in memory controller which controls the memory 103. The north bridge 102 further has a function of communicating with the GPU 104 to make the GPU 104 perform image processing in accordance with an instruction given from the CPU 101.

The GPU 104 operates as a display controller for the LCD 106 which is a display device of the computer 100. The GPU 104 converts video data received from the CPU 101 into a video signal with a format displayable on a display device such as the LCD 106, and outputs the video signal to the LCD 106. On this occasion, the VRAM 105 functions as a graphics memory for the GPU 104, so that the VRAM 105 is used as a buffer region when the GPU 104 performs image processing. The LCD 106 displays video in accordance with the video signal outputted from the GPU 104.

The south bridge 107 functions as a controller which controls respective devices on a Peripheral Component Interconnect (PCI) bus and various devices on a Low Pin Count (LPC) bus. The BIOS-ROM 108, the LAN controller 109, the HDD 110 and the ODD 112 are connected to the south bridge 107. The south bridge 107 has a built-in Integrated Drive Electronics (IDE) controller which controls the HDD 110 and the ODD 112. The south bridge 107 further has a function of communicating with the sound controller 113.

The BIOS-ROM 108 stores a Basic Input/Output System (BIOS) which is a program for controlling hardware of the computer 100.

The LAN controller 109 controls communication connection between the computer 100 and a LAN network. The LAN controller 109 also performs connection to the Internet through the LAN network. Further, the LAN controller 109 may receive video data for an IP television etc. through the LAN network.

The HDD 110 is a storage medium which stores various programs such as the operating system (OS) 130, the recording/reproducing program 140, etc. The HDD 110 is further used as a storage region which stores video data and audio data of television broadcasts received by the tuner 115 when the data are recorded.

The ODD 112 performs reading/writing of data from/into an optical disc such as a DVD. For example, the ODD 122 reads video data.

The sound controller 113 is a sound source device which outputs a signal of audio data as a subject of reproduction to the speakers 114. The speakers 114 output audio of the input audio signal.

The tuner 115 and the camera 116 are connected to the south bridge 107 through the PCI bus. The tuner 115 receives video data and audio data superposed on a television broadcast signal. Incidentally, the tuner 115 receives video data on which, for example, video data for two-dimensional display or video data for three-dimensional display are superposed. Incidentally, the term "video data for three-dimensional display" means video data containing left-eye and right-eye images. The camera 116 takes an image of a viewable area around the computer 100, that is, a region facing the LCD 106.

The EC/KBC 117 is connected to the south bridge 107 through the LPC bus. The EC/KBC 117 controls the keyboard 118 and the touchpad 119. The keyboard 18 and the touchpad 119 accept various operation inputs from the viewer. The EC/KBC 117 outputs these operation input signals to the CPU 101.

Figure 3:
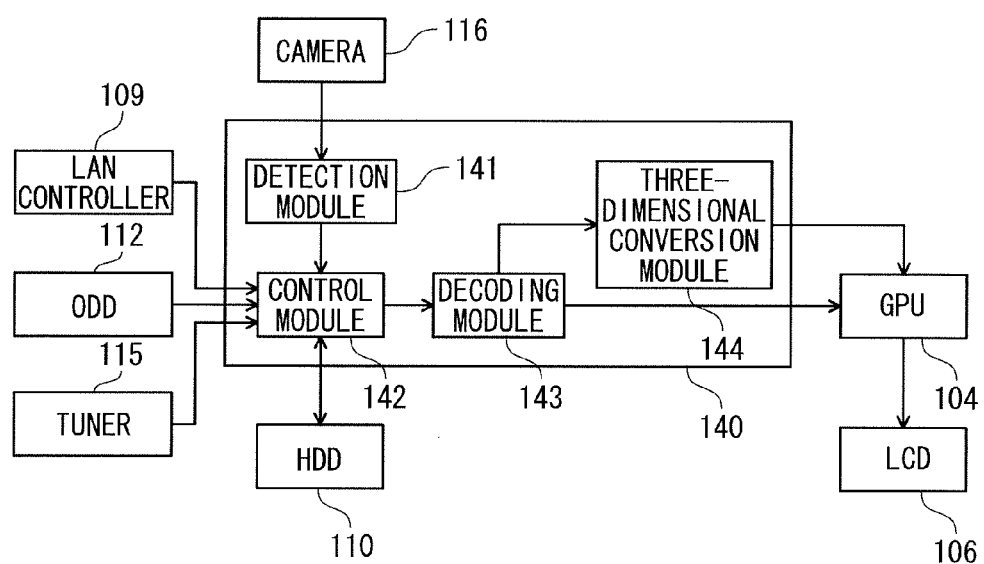
FIG. 3 is a diagram showing an example of functional blocks of a recording/reproducing program in the embodiment.

An example of functional blocks of the recording/reproducing program 140 will be described below with reference to FIG. 3.

The recording/reproducing program 140 has a detection module 141, a control module 142, a decoding module 143, a three-dimensional (3D) conversion module 144, etc.

The detection module 141 determines whether the viewer viewing the LCD 106 is wearing stereoscopic-viewing glasses or not. Captured images taken by an image-capturing device such as the camera 116 are inputted into the detection module 141 from the image-capturing device at intervals of a certain time period, for example, in a range of from several hundred milliseconds to several seconds. The detection module 141 detects an image of the viewer and an image of the stereoscopic-viewing glasses worn by the viewer, contained in each captured image. Successively, the detection module 141 determines whether the viewer is wearing stereoscopic-viewing glasses or not, based on detection of the inputted captured image.

When the detection module 141 detects the viewer wearing stereoscopic-viewing glasses based on the captured image, the detection module 141 outputs a notification of viewing indicating the fact that the viewer is currently viewing three-dimensional video to the control module 142. On the other hand, when the detection module 141 cannot detect the viewer wearing stereoscopic-viewing glasses based on the captured image, the detection module 141 outputs a notification of non-viewing indicating the fact that the viewer is not currently viewing three-dimensional video to the control module 142. When the detection module 141 cannot detect the viewer based on the captured image, the detection module 141 also outputs the notification of non-viewing.

Incidentally, it is not necessary that the detection module 141 receives the captured image from the built-in camera 116 of the computer 100. That is, for example, the detection module 141 may receive the captured image from an image-capturing device connected to the computer 100 after factory shipment of the computer 100 as long as the captured image is taken, as an image of the viewer viewing the LCD 106 of the computer 100, from the vicinity of the LCD 106.

The control module 142 receives video data for three-dimensional display or two-dimensional display from the LAN controller 109, the ODD 112, the tuner 115, the HDD 110, etc. The control module 142 controls processing of reproducing the inputted video data and processing of recording the inputted video data.

The reproducing processing will be described first. When video data for three-dimensional display containing left-eye and right-eye images are inputted into the control module 142, the control module 142 outputs the video data to the decoding module 143 and instructs the decoding module 143 to decode the video data in a form corresponding to the format of the video data. That is, because formats such as Side-by-Side, Top-and-Bottom, Frame-Packing, etc. are used as formats of video data for three-dimensional display, the control module 142 instructs the decoding module 143 to decode video data for three-dimensional display in accordance with these formats. When video data for two-dimensional display are inputted into the control module 142, the control module 142 outputs the video data to the decoding module 143 and instructs the decoding module 143 to output the decoded video data to the three-dimensional conversion module 144. That is, in the reproducing process, the control module 142 can control the LCD 106 to display three-dimensional video based on the video data for three-dimensional display or two-dimensional display.

In the recording process, the control module 142 outputs video data inputted into the control module 142 to the HDD 110 to store the video data in the HDD 110. Incidentally, the control module 142 may perform control in the recording processing so that video data are stored in an external storage device connected to the computer 100 by wire or wireless.

Incidentally, the control module 142 controls the reproducing processing and the recording processing in accordance with a notification given from the detection module 141. That is, the control module 142 controls the reproducing processing and the recording processing in accordance with whether the viewer viewing video displayed by the computer 100 is wearing stereoscopic-viewing glasses or not.

When the control module 142 receives a notification of non-viewing from the detection module 141 while video of video data inputted from the tuner 115 or the like is decoded (reproduced) by the decoding module 143, the control module 142 stops reproduction and starts recording. Specifically, the control module 142 stops reproduction by, for example, stopping outputting of video data given to the control module 142 to the decoding module 143 and outputs the video data to the HDD 110 to store the video data in the HDD 110 to thereby perform recording.

When the control module 142 then receives a notification of viewing from the detection module 141 after the notification of non-viewing, the control module 142 reads video data stored in the HDD 110 and outputs the video data to the decoding module 143 to restart the reproducing process. Incidentally, while the decoding module 143 performs reproduction of video data stored in the HDD 110, the control module 142 continues the recording process.

When the control module 142 receives a notification of non-viewing from the detection module 141 while the control module 142 outputs video data of the HDD 110 to the decoding module 143 to decode (reproduce) the video data, the control module 142 stops reproduction of the video data of the HDD 110 and stores information about the reproduction stop position of the video data in the HDD 110. When a notification of viewing is inputted into the control module 142 again, the control module 142 reads video data stored in the HDD 110 from the reproduction stop position and outputs the video data to the decoding module 143 to reproduce the video data.

The decoding module 143 decodes video data for two-dimensional display or three-dimensional display inputted from the control module 142. When the decoding module 143 decodes video data for two-dimensional display, the decoding module 143 outputs the decoded video data to a module (either of the three-dimensional conversion module 144 and the GPU 104) in accordance with an instruction given from the control module 142.

For decoding video data for three-dimensional display, the decoding module 143 decodes the inputted video data in a form corresponding to the instruction given from the control module 142. That is, the decoding module 143 decodes video data for three-dimensional display in a form corresponding to the format of the video data, Side-by-Side, Top-and-Bottom or Frame-Packing.

The three-dimensional conversion module 144 generates video data for three-dimensional display based on the decoded video data for two-dimensional display. The three-dimensional conversion module 144 analyzes respective frames of the decoded video data and calculates depth positions for each pixel contained in each frame, for example, by using pixel motion between frames, differences between pixel values within the same frame, etc. The three-dimensional conversion module 144 generates left-eye and right-eye image data corresponding to one frame based on the estimated depth positions for each pixel. The three-dimensional conversion module 144 outputs video data for three-dimensional display, containing the generated left-eye and right-eye image data, to the GPU 104.

An example of processing of detecting stereoscopic-viewing glasses by the detection module 141 will be described below with reference to FIGS. 4A and 4B. Each of FIGS. 4A and 48 shows an example of an image captured by the camera 116 and inputted into the detection module 141.

Figure 4A:
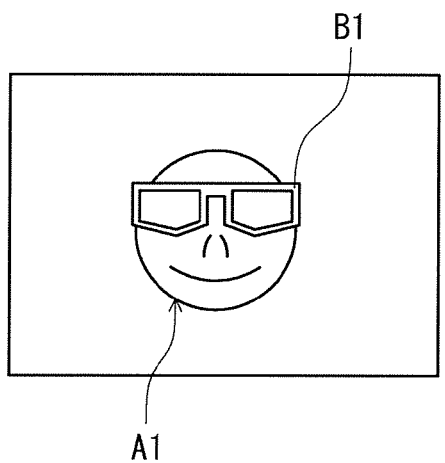
FIGS. 4A and 4B are views showing examples of captured image inputted into the computer according to the embodiment.

A captured image shown in FIG. 4A contains a viewer's face image A1, a stereoscopic-viewing glasses image B1, etc. The detection module 141 detects the face image and the stereoscopic-viewing glasses image, for example, by using face image verification data and stereoscopic-viewing glasses verification data registered in advance.

For example, the face image verification data are feature point data indicating the shape of the viewer's face, face image data, etc. The face image verification data may be verification data in accordance with each person or may be data concerned with general features of human faces. Moreover, the face image verification data may be feature point data and face images concerned with faces wearing stereoscopic-viewing glasses. For example, the stereoscopic-viewing glasses verification data are image data of stereoscopic-viewing glasses and feature point data indicating the shape of stereoscopic-viewing glasses etc.

The detection module 141 detects images similar or identical to these verification data to thereby detect a face image and a stereoscopic-viewing glasses image contained in the captured image. Incidentally, the detection module 141 may not necessarily detect both the face image and the stereoscopic-viewing glasses image. For example, the detection module 141 may detect only the stereoscopic-viewing glasses image. In the example shown in FIG. 4A, the detection module 141 detects a viewer wearing stereoscopic-viewing glasses or detects stereoscopic-viewing glasses per se, and outputs a notification of viewing to the control module 142 in order to indicate the fact that the viewer is currently viewing three-dimensional video.

Figure 4B:
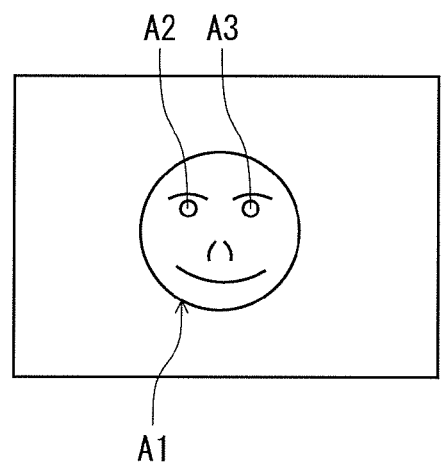

A captured image 400b shown in FIG. 4B contains a viewer's face image A1. In this example, the detection module 141 detects the face image A1 from the captured image 400b but does not detect any image of stereoscopic-viewing glasses. Accordingly, the detection module 141 outputs a notification of non-viewing to the control module 142. Moreover, for example, the detection module 141 may detect a viewer's eye image A2, a viewer's eyebrow image A3, etc. to thereby determine that the viewer is not wearing the stereoscopic-viewing glasses, and output a notification of non-viewing. That is, the detection module 141 may determine that the viewer is not wearing the stereoscopic-viewing glasses, when a portion which should be hidden behind the glasses in the case where the glasses are being worn by the viewer is detected from the captured image. Incidentally, when the detection module 141 cannot detect any viewer image from the captured image or when the detection module 141 cannot detect any stereoscopic-viewing glasses image from the captured image, the detection module 141 also outputs a notification of non-viewing.

Examples of a reproducing and recording processing based on the recording/reproducing program 140 will be described below with reference to FIGS. 5A and 5B.

Figure 5A:
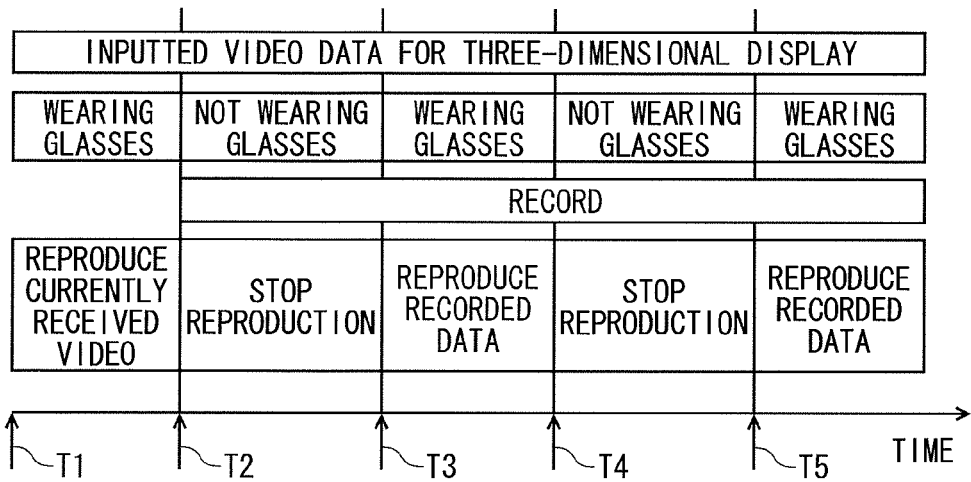
FIGS. 5A and 5B are views showing examples of processing concerned with video display performed by the computer according to the embodiment.
Figure 5B:
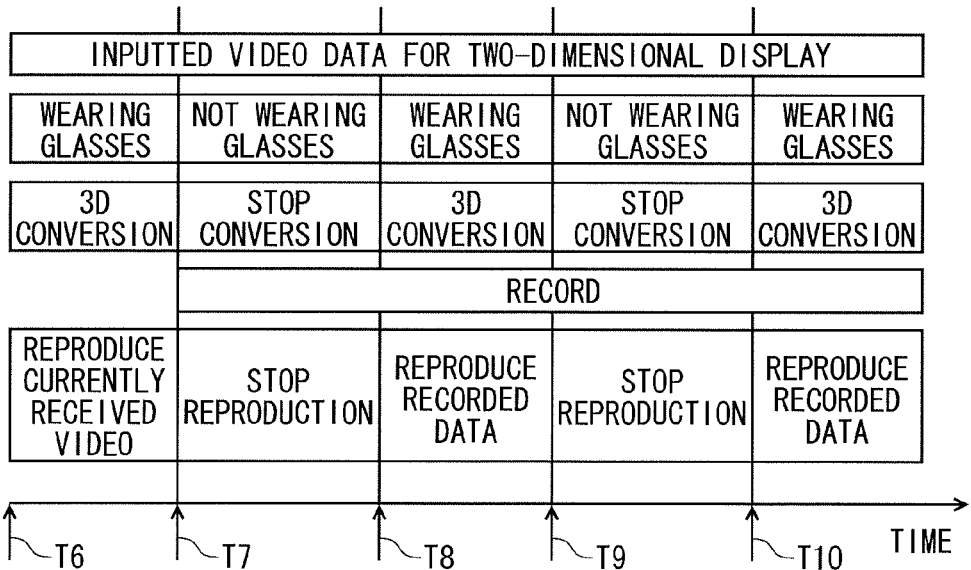

FIG. 5A is a view showing an example of processing when video data for three-dimensional display are inputted into the recording/reproducing program 140.

First, at time T1 when video data are inputted into the recording/reproducing program 140 and an image of the viewer wearing stereoscopic-viewing glasses is detected by the detection module 141, the control module 142 outputs the inputted video data to the decoding module 143. The decoding module 143 decodes (reproduces) the video data and outputs the decoded video data to the GPU 104. The GPU 104 generates a video signal from the inputted video data, so that the LCD 106 displays three-dimensional video based on the video signal.

At time T2 when the viewer wearing the stereoscopic-viewing glasses cannot be detected by the detection module 141, the control module 142 stops outputting of the video data inputted into the control module 142 to the decoding module 143 and stops decoding (reproduction) and display of three-dimensional video. At time T2, the control module 142 outputs the video data inputted into the control module 142 to the HDD 110 to start recording of the video data.

Then, at time T3 when the viewer wearing the stereoscopic-viewing glasses is detected by the detection module 141, the control module 142 reads the video data (recording of which started at time T2) from the HDD 110 and outputs the video data to the decoding module 143. The decoding module 143 decodes (reproduces) the video data, so that the LCD 106 displays three-dimensional video. That is, when an image of the stereoscopic-viewing glasses is detected by the detection module 141 at time T3 after the image of the stereoscopic-viewing glasses was not detected by the detection module 141 at time T2, the computer 100 displays three-dimensional video based on video of the video data recorded on the HDD 110. Display of the three-dimensional video at time T3 is restarted from the position (time point) where display of the video was stopped at time T2. Incidentally, the control module 142 continues the recording processing of video data inputted into the control module 142 even after time T3.

Then, at time T4 when the viewer wearing the stereoscopic-viewing glasses cannot be detected by the detection module 141, the control module 142 stops reading of the video data from the HDD 110 and stops decoding (reproduction) of the video data and display of three-dimensional video. On this occasion, the control module 142 controls the HDD 110 to store the position where reproduction of the video data is stopped. Incidentally, the control module 142 continues the recording processing of video data inputted into the control module 142 even after time T4.

At time T5 when the viewer wearing the stereoscopic-viewing glasses is detected by the detection module 141, the control module 142 reads the video data stored in the HDD 110 from the position where reproduction was stopped at time T4, and outputs the video data to the decoding module 143. That is, when an image of the stereoscopic-viewing glasses is detected by the detection module 141 at time T5 after the image of the stereoscopic-viewing glasses was not detected by the detection module 141 at time T4, the computer 100 displays three-dimensional video based on video of the video data recorded on the HDD 110. The display of three-dimensional video at time T5 is restarted from the position (time point) where reproduction and display of three-dimensional video based on the recorded data was stopped at time T4.

Although FIG. 5A shows that the recording/reproducing program 140 stops reproduction for a duration between time T2 and time T3 and for a duration between time T4 and time T5, the reproduction may not be necessarily stopped. That is, three-dimensional video may be displayed for the duration between time T2 and time T3 and for the duration between time T4 and time T5. In this case, the recording/reproducing program 140 controls the HDD 110 to store information about the reproduction position where the video data were decoded (reproduced) at time T2 (or time T4). At time T3 (or time T5), the recording/reproducing program 140 reads the video data from the position where the video data were reproduced at time T2 (or time T4), based on the information about the reproduction position. That is, display of three-dimensional video at time T3 (or time T5) is restarted from the reproduction position (time point) where the video data were reproduced and displayed at time T2 (or time T4) when the image of the stereoscopic-viewing glasses could not be detected.

Successively, an example of processing performed by the recording/reproducing program 140 when video data for two-dimensional display are inputted into the recording/reproducing program 140 will be described with reference to FIG. 5B.

First, at time T6 when video data are inputted into the recording/reproducing program 140 and the viewer wearing the stereoscopic-viewing glasses is detected by the detection module 141, the control module 142 outputs the inputted video data to the decoding module 143. The decoding module 143 decodes (reproduces) the video data and outputs the decoded video data to the three-dimensional conversion module 144. The three-dimensional conversion module 144 generates video data for three-dimensional display based on the inputted video data, and outputs the generated video data to the GPU 104. The GPU 104 generates a video signal from the inputted video data, so that the LCD 106 displays three-dimensional video based on the video signal.

At time T7 when the viewer wearing the stereoscopic-viewing glasses cannot be detected by the detection module 141, the control module 142 instructs the three-dimensional conversion module 144 to stop conversion of the video data. The control module 142 stops outputting of the video data inputted into the control module 142 to the decoding module 143 and stops decoding (reproduction). Incidentally, the control module 142 may continue decoding of the video data to display two-dimensional video on the LCD 106. At time T7, the control module 142 outputs the video data inputted into the control module 142 to the HOD 110 to start recording of the video data.

At time T8 when the viewer wearing the stereoscopic-viewing glasses is detected by the detection module 141, the control module 142 reads the video data (recording of which started at time T7) from the HDD 110 and outputs the video data to the decoding module 143. The decoding module 143 decodes (reproduces) the video data, and outputs the decoded video data to the three-dimensional conversion module 144. The three-dimensional conversion module 144 converts the inputted video data for two-dimensional display into video data for three-dimensional display. The video data for three-dimensional display are converted into a video signal by the GPU 104, so that the LCD 106 displays three-dimensional video. Incidentally, the control module 142 continues the recording processing of video data inputted into the control module 142 even after time T8.

Then, at time T9 when the viewer wearing the stereoscopic-viewing glasses cannot be detected by the detection module 141, the control module 142 instructs the three-dimensional conversion module 144 to stop conversion of the video data. The control module 142 stops reading of the video data from the HDD 110 and stops decoding (reproduction) of the video data. On this occasion, the control module 142 controls the HDD 110 to store the position where reproduction of the video data is stopped. Incidentally, the control module 142 continues the recording processing of video data inputted into the control module 142 even after time T9.

At time T10 when the viewer wearing the stereoscopic-viewing glasses is detected by the detection module 141, the control module 142 reads the video data stored in the HDD 110 from the position where reproduction was stopped at time T9, and outputs the video data to the decoding module 143. The three-dimensional conversion module 144 generates video data for three-dimensional display based on the decoded video data for two-dimensional display.

Incidentally, the recording/reproducing program 140 may display three-dimensional video without stopping reproduction for a duration between time T7 and time T8 and for a duration between time T9 and time T10. In this case, the recording/reproducing program 140 controls the HDD 110 to store information about the reproduction position where the video data were decoded (reproduced) at time T7 (or time T9). At time T8 (or time T10), the recording/reproducing program 140 reads the video data from the position where the video data were reproduced at time T7 (or time T9), based on the information about the reproduction position.

The recording/reproducing program 140 may display two-dimensional video for the duration between time T7 and time T8 and for the duration between time T9 and time T10. In this case, the recording/reproducing program 140 stops the conversion processing performed by the three-dimensional conversion module 144. The decoding module 143 outputs the decoded video data not to the three-dimensional conversion module 144 but to the GPU 104.

Next, an example of a processing flow concerned with video display performed by the computer 100 when video data for three-dimensional display are inputted into the recording/reproducing program 140 will be described with reference to FIG. 6.

First, the tuner 115 receives a broadcast signal on which video data for three-dimensional display are superposed, and the tuner 115 outputs the video data contained in the broadcast signal to the control module 142 (S601). The control module 142 outputs the inputted video data to the decoding module 143, the decoding module 143 decodes (reproduces) the video data, and the LCD 106 displays three-dimensional video based on the decoded video data (S602).

Then, the camera 116 captures an image in front of the LCD 106 of the computer 100 and outputs the captured image to the detection module 141. The detection module 141 detects a viewer's face image and a stereoscopic-viewing glasses image from the input captured image and determines whether the viewer is wearing the stereoscopic-viewing glasses or not (S603). When the viewer wearing the stereoscopic-viewing glasses is detected by the detection module 141 (Yes in S603), the determination processing of S603 is repeated while the computer 100 continues display of the three-dimensional video.

On the other hand, when the viewer wearing the stereoscopic-viewing glasses is not detected by the detection module 141 in the step S603 (No in S603), the decoding module 143 stops decoding (reproduction) of the video data and the LCD 106 stops display of the three-dimensional video (S604). The control module 142 starts recording processing to control the HDD 110 to store video data received by the tuner 115 (S605).

When the viewer wearing the stereoscopic-viewing glasses is detected by the detection module 141 (Yes in S606), the control module 142 reads the video data recorded on the HDD 110 to control the decoding module 143 to decode (reproduce) the video data so that the LCD 106 displays three-dimensional video based on the decoded video data (S607). Incidentally, when the reproduction stop position concerned with the video data of the HDD 110 is stored, the control module 142 reads the video data from the reproduction stop position in the step S607. When reproduction of the recorded video data is completed (Yes in S608), the processing flow is completed.

On the other hand, when reproduction of the recorded video data is not completed (No in S608) and the viewer wearing the stereoscopic-viewing glasses cannot be detected by the detection module 141 (No in S609), the control module 142 stops reading of the video data from the HDD 110 and stops outputting of the read video data to the decoding module 143 to thereby stop the reproduction processing of the recorded data (S610). In this case, the control module 142 controls the HDD 110 to store information about the position where reproduction of the video data was stopped (S611). The recording/reproducing program 140 repeats the processing of the steps S606 to S611. When reproduction is completed in the step S608, the processing flow is completed.

Figure 7:
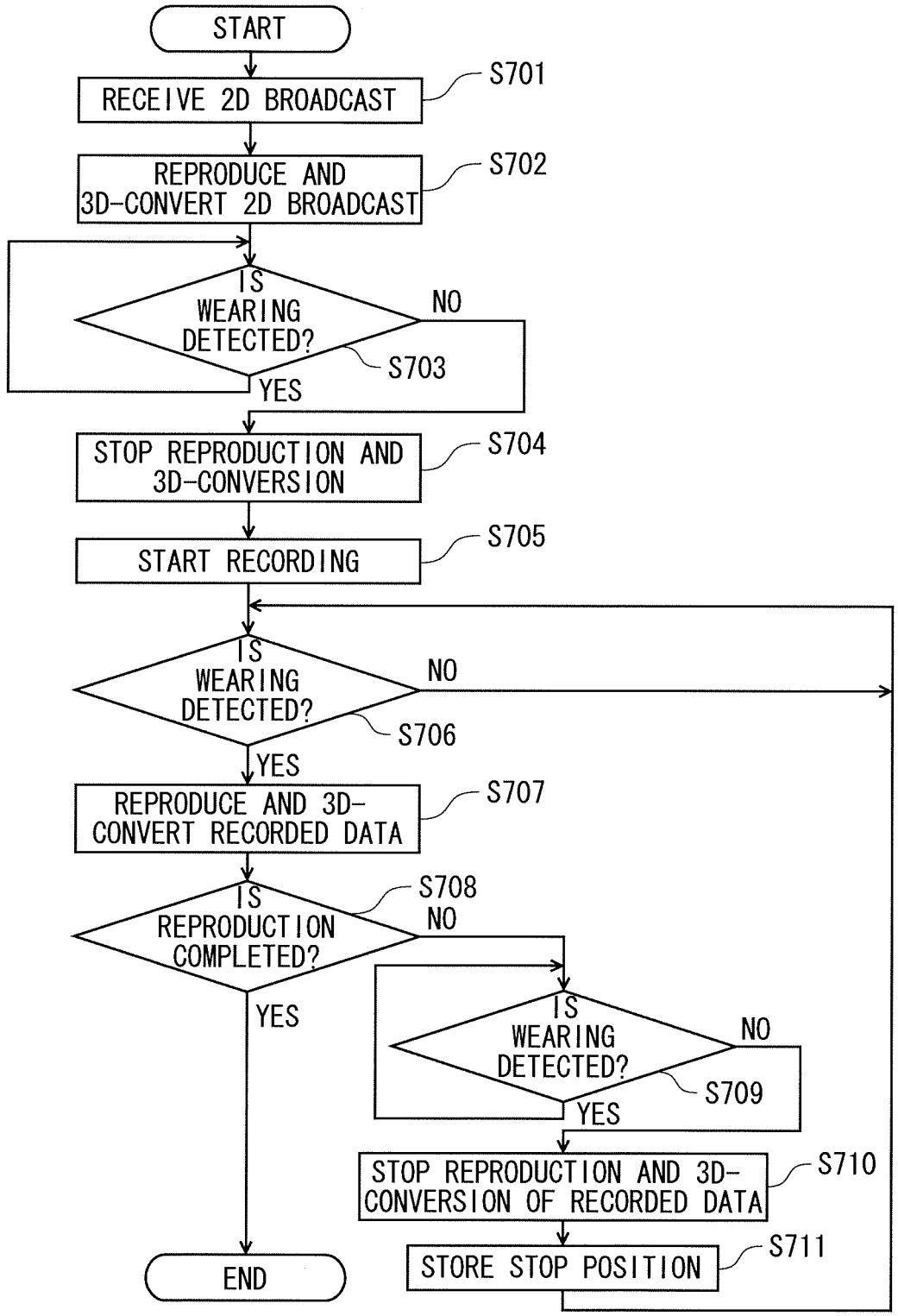
FIG. 7 is a flow chart showing an example of a processing flow concerned with video display performed by the computer according to the embodiment.

Next, an example of a processing flow concerned with video display performed by the computer 100 when video data for two-dimensional display are inputted into the recording/reproducing program 140 will be described with reference to FIG. 7.

First, the tuner 115 receives a broadcast signal on which video data for two-dimensional display are superposed, and the tuner 115 outputs the video data contained in the broadcast signal to the control module 142 (S701). The control module 142 outputs the inputted video data to the decoding module 143, the decoding module 143 decodes (reproduces) the video data, and the three-dimensional conversion module 144 converts the decoded video data for two-dimensional display into video data for three-dimensional display (S702). The converted video data are converted into a video signal by the GPU 104, so that the LCD 106 displays three-dimensional video based on the video signal.

Then, the camera 116 captures an image in front of the LCD 106 of the computer 100 and outputs the captured image to the detection module 141. The detection module 141 detects a viewer's face image and a stereoscopic-viewing glasses image from the input captured image and determines whether the viewer is wearing the stereoscopic-viewing glasses or not (S703). When the viewer wearing the stereoscopic-viewing glasses is detected by the detection module 141 (Yes in S703), the determination processing of the step S703 is repeated while the computer 100 continues display of the three-dimensional video.

On the other hand, when the viewer wearing the stereoscopic-viewing glasses is not detected by the detection module 141 in the step S703 (No in S703), the decoding module 143 stops decoding (reproduction) of the video data, the three-dimensional conversion module 144 stops conversion of the video data, and the LCD 106 stops display of the three-dimensional video (S704). The control module 142 starts a recording processing to control the HDD 110 to store video data received by the tuner 115 (S705).

When the viewer wearing the stereoscopic-viewing glasses is detected by the detection module 141 (Yes in S706), the control module 142 reads the video data recorded on the HDD 110. Incidentally, when the reproduction stop position concerned with the video data of the HDD 110 is stored, the control module 142 reads the video data from the reproduction stop position. Then, the decoding module 143 decodes (reproduces) the read video data, and the three-dimensional conversion module 144 converts the decoded video data into video data for three-dimensional display (S707). The LCD 106 displays three-dimensional video based on the three-dimensionally converted video data. When reproduction of the recorded video data is completed (Yes in S708), the processing flow is completed.

On the other hand, when reproduction of the recorded video data is not completed (No in S708) and the viewer wearing the stereoscopic-viewing glasses cannot be detected by the detection module 141 (No in S709), the control module 142 stops reading of the video data from the HDD 110 and stops outputting of the read video data to the decoding module 143 to thereby stop reproduction and three-dimensional conversion of the recorded data. In this case, the control module 142 controls the HDD 110 to store information about the position where reproduction of the video data was stopped (S711). The recording/reproducing program 140 repeats the processing of the steps S706 to S711. When reproduction is completed in the step S708, the processing flow is completed.

According to the aforementioned embodiment, recording can be performed at a suitable time in accordance with whether the viewer viewing the LCD 106 is wearing the stereoscopic-viewing glasses 200 or not.

Incidentally, the invention is not limited to the embodiment per se and configuration modules of the invention may be modified to embody the invention without departing from the gist of the invention in a practical stage. For example, the computer 100 may be configured so that a part or all of functions of the recording/reproducing program 140 are performed by a chip or the like mounted in the computer. The camera 116 may not be built in the computer housing but may be provided as an external camera. In this case, the camera need not be mounted at the time of factory shipment but is at least required to be mounted when the computer 100 is used. Configuration modules disclosed in the embodiment may be combined suitably to form various inventions. For example, some configuration modules may be removed from all the configuration modules disclosed in the embodiment.

What is claimed is:

1. A display apparatus that can display three-dimensional video to a viewer wearing stereoscopic-viewing glasses, the display apparatus comprising:
   an input module to which video data is input;
   a display device;
   an image input module to which, from an image-capturing device that captures an image around the display apparatus and on a front side of the display device, the captured image is input;
   a detection module configured to detect an image of the stereoscopic-viewing glasses and/or a viewer's face from the input captured image;
   a determination module configured to further detect an eye of the viewer's face from the detected image and determines as to whether or not the viewer is wearing the stereoscopic-viewing glasses;
   a recording module configured to record the input video data when the determination module determines that the viewer is not wearing the stereoscopic-viewing glasses; and
   a decoding module configured to (i) decode the input video data and (ii) refrain from decoding the input video data if the determination module determines that the viewer is not wearing the stereoscopic-viewing glasses,
   wherein the display device is configured to display the three-dimensional video based on the decoded video data.

2. The display apparatus of claim 1, wherein when the determination module further determines that the viewer is wearing the stereoscopic-viewing glasses after the determination module determined that the user did not wear the stereoscopic-viewing glasses, the display device displays the three-dimensional video based on video of the video data recorded by the recording module.

3. The display apparatus of claim 2, wherein when the determination module determines that the viewer is not wearing the stereoscopic-viewing glasses, the display device stops display of the three-dimensional video.

4. The display apparatus of claim 3, wherein when the determination module further determines that the viewer is wearing the stereoscopic-viewing glasses after the determination module determined that the viewer did not wear the stereoscopic-viewing glasses, the display device displays the three-dimensional video based on video of the video data recorded by the recording module from a time point where the display is stopped.

5. The display apparatus of claim 1, wherein the detection module is configured to detect the image of the stereoscopic-viewing glasses and the image of the viewer's face from the input captured image.

6. A display apparatus that can display three-dimensional video to a viewer wearing stereoscopic-viewing glasses, the display apparatus comprising:
   an input module to which video data is input;
   a decoding module configured to decode the input video data;
   a generation module configured, when the input video data are video data for two-dimensional display, to generate video data for three-dimensional display using the decoded video data for two-dimensional display;
   a display device configured to display the three-dimensional video based on the generated video data for three-dimensional display;

an image input module to which, from an image-capturing device that captures an image around the display apparatus and on a front side of the display device, the captured image is input;

a detection module configured to detect an image of the stereoscopic-viewing glasses from the input captured image;

a recording module configured to record the input video data when the detection module doesn't detect the image of the stereoscopic-viewing glasses, wherein the decoding module is configured not to decode the input video data if the detection module does not detect the image of the stereoscopic-viewing glasses, the display device is configured to (i) stop display of the three-dimensional video when the detection module does not detect the image of the stereoscopic-viewing glasses, and (ii) display the three-dimensional video based on the video data recorded by the recording module when the detection module detects the image of the stereoscopic-viewing glasses after the detection module did not detect the image of the stereoscopic-viewing glasses, and the generation module is configured to stop generation of the video data for three-dimensional display if the detection module does not detect the image of the stereoscopic-viewing glasses.

7. A recording method in a display apparatus that can display three-dimensional data to a viewer wearing stereoscopic-viewing glasses, the recording method comprising:

receiving video data;

receiving, from an image-capturing device that captures an image around the display apparatus and on a front side of the display device, the captured image;

detecting an image of the stereoscopic-viewing glasses or a viewer's face from the received captured image;

further detecting an eye of the viewer's face from the detected image and determining as to whether or not the viewer is wearing the stereoscopic-viewing glasses; and recording the received video data when it is determined that the image shows the viewer is not wearing the stereoscopic-viewing glasses; and decoding the received video data and refraining from decoding the received video data upon determining that the viewer is not wearing the stereoscopic-viewing glasses;

and displaying the three-dimensional video based on the decoded received video data.

8. The method of claim 7, wherein the detecting detects the image of the stereoscopic-viewing glasses and the image of the viewer's face from the input captured image.

9. A display apparatus that can display three-dimensional video to a viewer wearing stereoscopic viewing glasses, the display apparatus comprising:

an input module to which video data is input;

a decoding module configured to decode the input video data and refrain from decoding the input video data upon determining that the viewer is not wearing the stereoscopic-viewing glasses;

a generation module configured, when the input video data is video data for two-dimensional video data, to generate video data for three-dimensional display using the decoded video data for two-dimensional display;

an image input module to which, from an image-capturing device that captures an image around the display apparatus and on a front side of the display device, the captured image is input;

a detection module configured to detect an image of the stereoscopic-viewing glasses from the input captured image;

and a recording module to record the input video data when the detection module does not detect the image of the stereoscopic-viewing glasses, wherein when the detection module does not detect the image of the stereoscopic-viewing glasses, the display device stops display of the three-dimensional video, and when the detection module does not detect the image of the stereoscopic-viewing module, the generation module stops generation of the video data for three-dimensional display.

10. A display apparatus that can display three-dimensional video to a viewer wearing stereoscopic viewing glasses, the display apparatus comprising:

an input module to which video data is input;

a decoding module configured to decode the input video data and refrain from decoding the input video data upon determining that the viewer is not wearing the stereoscopic-viewing glasses;

a generation module configured, when the input video data is video data for two-dimensional video data, to generate video data for three-dimensional display using the decoded video data for two-dimensional display;

a display device configured to display the three-dimensional video based on the generated video data for three-dimensional display;

an image input module to which, from an image-capturing device that captures an image around the display apparatus and on a front side of the display device, the captured image is input;

a detection module configured to detect an image of the stereoscopic-viewing glasses from the input captured image;

and a recording module to record the input video data when the detection module does not detect the image of the stereoscopic-viewing glasses, wherein when the detection module does not detect the image of the stereoscopic-viewing glasses, the display device stops display of the three-dimensional video, and when the detection module does not detect the image of the stereoscopic-viewing module, the generation module stops generation of the video data for three-dimensional display.

* * * * *